(12) United States Patent
Wu et al.

(10) Patent No.: US 10,300,972 B2
(45) Date of Patent: May 28, 2019

(54) BICYCLE SEAT

(71) Applicant: GIANT MANUFACTURING CO., LTD., Taichung Hsien (TW)

(72) Inventors: Chi-Ming Wu, Changhua County (TW); Che-Wei Hsu, New Taipei (TW)

(73) Assignee: GIANT MANUFACTURING CO., LTD. (TW)

( * ) Notice: Subject to any disclaimer, the term of this patent is extended or adjusted under 35 U.S.C. 154(b) by 154 days.

(21) Appl. No.: 15/592,040

(22) Filed: May 10, 2017

(65) Prior Publication Data

US 2017/0240235 A1 Aug. 24, 2017

Related U.S. Application Data

(63) Continuation of application No. 14/023,469, filed on Sep. 11, 2013, now Pat. No. 9,676,434.

(30) Foreign Application Priority Data

Sep. 13, 2012 (TW) .............................. 101133479 A

(51) Int. Cl.
| | |
|---|---|
| B62J 1/26 | (2006.01) |
| B62J 1/18 | (2006.01) |
| B62J 1/00 | (2006.01) |
| B62J 1/08 | (2006.01) |

(52) U.S. Cl.
CPC . B62J 1/26 (2013.01); B62J 1/00 (2013.01); B62J 1/08 (2013.01); B62J 1/18 (2013.01)

(58) Field of Classification Search
CPC .......................................................... B62J 1/26
USPC ...................... 297/195.1, 214, 202
See application file for complete search history.

(56) References Cited

U.S. PATENT DOCUMENTS

| | | | |
|---|---|---|---|
| 3,459,179 A | 8/1969 | Olesen | |
| 3,552,044 A | 1/1971 | Wiele | |
| 5,333,930 A | 8/1994 | Glenn | |
| 5,348,369 A | 9/1994 | Yu | |
| 6,136,426 A | 10/2000 | Bigolin | |
| 6,197,099 B1 | 3/2001 | Pearce | |
| 6,857,151 B2 | 2/2005 | Jusiak | |
| 7,572,498 B2 | 8/2009 | Bigolin | |
| 8,584,286 B2 | 11/2013 | Call | |
| 9,132,874 B2 * | 9/2015 | Sam ........................... | B62J 1/22 |

(Continued)

FOREIGN PATENT DOCUMENTS

| | | |
|---|---|---|
| EP | 0718144 | 6/1996 |
| FR | 2791944 | 10/2000 |

(Continued)

OTHER PUBLICATIONS

European Search Report dated Nov. 18, 2013, European Patent Application No. 13183937.5.

(Continued)

Primary Examiner — Sarah B McPartlin
(74) Attorney, Agent, or Firm — Vierra Magen Marcus LLP

(57) ABSTRACT

A bicycle seat includes a deformation space that corresponds to a pressure deformation of a bicycle rider. Wherein, a plurality of filler particles is filled in the deformation space. Therefore, the plurality of filler particles in the deformation space is sliding and rolling under pressure, and the bicycle seat can average support the body of the rider and bring lower friction.

10 Claims, 8 Drawing Sheets

(56) References Cited

U.S. PATENT DOCUMENTS

| | | | |
|---|---|---|---|
| 2005/0104423 A1 | 5/2005 | Yu | |
| 2014/0138196 A1* | 5/2014 | Mazzucchelli | F16F 7/01 188/268 |

FOREIGN PATENT DOCUMENTS

| | | |
|---|---|---|
| JP | H08150864 | 6/1996 |
| JP | H08150976 | 6/1996 |
| JP | H08323071 | 12/1996 |
| JP | 2005230499 | 9/2005 |
| JP | 2006232001 | 9/2006 |
| JP | 2014521550 | 8/2014 |
| WO | WO2011141832 | 11/2011 |
| WO | WO2011148272 | 12/2011 |

OTHER PUBLICATIONS

Japanese Notification of Reasons for Refusal dated Oct. 14, 2014, Japanese Patent Application No. 2013-188401.
English Abstract of Japanese Patent Application No. JPH08150864.
English Abstract of Japanese Patent Application No. JPH08150976.
English Abstract of Japanese Patent Application No. JPH08323071.
English Abstract of Japanese Patent Application No. JP2014521550.
Japanese Office Action dated Jun. 23, 2715, Japanese Patent Application No. 2013-188401.
Office Action dated Apr. 14, 2014, U.S. Appl. No. 14/023,469.
Response to Office Action dated Sep. 11, 2014, U.S. Appl. No. 14/023,469.
Office Action dated Nov. 24, 2014, U.S. Appl. No. 14/023,469.
Response to Office Action dated Jan. 27, 2015, U.S. Appl. No. 14/023,469.
Office Action dated Feb. 13, 2015, U.S. Appl. No. 14/023,469.
Response to Office Action dated Jul. 10, 2015, U.S. Appl. No. 14/023,469.
Office Action dated Oct. 6, 2015, U.S. Appl. No. 14/023,469.
Response to Office Action dated Jan. 27, 2016, U.S. Appl. No. 14/023,469.
Office Action dated Feb. 9, 2016, U.S. Appl. No. 14/023,469.
Response to Office Action dated Jun. 30, 2016, U.S. Appl. No. 14/023,469.
Office Action dated Aug. 2, 2016, U.S. Appl. No. 14/023,469.
Response to Office Action dated Jan. 23, 2016, U.S. Appl. No. 14/023,469.
Notice of Allowance dated Feb. 10, 2017, U.S. Appl. No. 14/023,469.

* cited by examiner

BICYCLE SEAT

RELATED APPLICATIONS

This application claims priority to Taiwan Application Serial Number 101133479 filed Sep. 13, 2012, which is herein incorporated by reference.

BACKGROUND

Field of Disclosure

The present disclosure relates to a vehicle seat. More particularly, the present disclosure relates to a bicycle seat.

Description of Related Art

A bicycle seat is one of the most important parts of a bicycle touching a rider riding the bicycle. The fit of a bicycle seat and the adjustment of a rider's position on the bicycle have close relationships with the rider's overall performance, riding posture and body gravity.

Prior arts attempt to solve this problem of rider's positioning on the bicycle seat. Some manufacturers and designers install a spring support element under the bicycle seat, so that the sore buttocks or tail bone of rider can avoid shock. However, the spring support element will cause resetting shock and pressure to the buttocks or the tail bone of the rider who sitting on the bicycle seat for extended periods of time.

As is known, another bicycle seat is improved by arranging a padding, in which the padding generally is formed from a soft material, and the padding is deformed by a sitting pressure. However, the padding has a large amount of deformation under pressure. The padding is not always suitable to provide a comfortable characteristic to the rider. Furthermore, this kind of "padding" apparatus is usually designed to be softer and thicker. But the padding is too thick to fit the needs of those who need adequate support to finish a long cycling. When the padding has supported a rider for a long time, the padding will increase friction area and prolonged friction to the buttocks or the tail bone of the rider.

On the other hand, if a padding is designed to be hard and thin, the padding will reduce the friction area and cause prolonged friction to the buttocks or the tail bone. However, when the padding has supported a rider for a long time, the padding will cause the pain from concentrated and prolonged pressure to a buttocks or a tail bone of the rider.

SUMMARY

According to one embodiment of the present disclosure, a bicycle seat includes a body. The body has a support portion, a foamed layer and a seat cover. Wherein the body has a deformation space that is filled with a plurality of filler particles, and the deformation space is configured to be deformed by a sitting pressure. When the deformation space is configured to be deformed from the sitting pressure, the particles in the deformation space are sliding and rolling under pressure.

According to another embodiment of the present disclosure, a bicycle seat includes a body. The body has a support portion and a seat cover. Wherein deformation space is located between the support portion and the seat cover, and a plurality of filler particles fills the deformation space. The plurality of filler particles are restricted in the deformation space. Therefore, the particles in the deformation space are sliding and rolling under pressure, and the bicycle seat can average support a rider and bring lower friction.

According to yet another embodiment of the present disclosure. A deformation space of the bicycle seat is located in the foamed layer. Wherein the deformation space is opened among the foamed layer, and the foamed layer has a downward opening closed by the support portion or an upward opening closed by the seat cover.

Furthermore, the plurality of filler particles have the same size or different sizes. Wherein the plurality of filler particles can be into a powder, and the powder is a dry, bulk solid composed of a large number of very fine particles that may flow under pressure.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
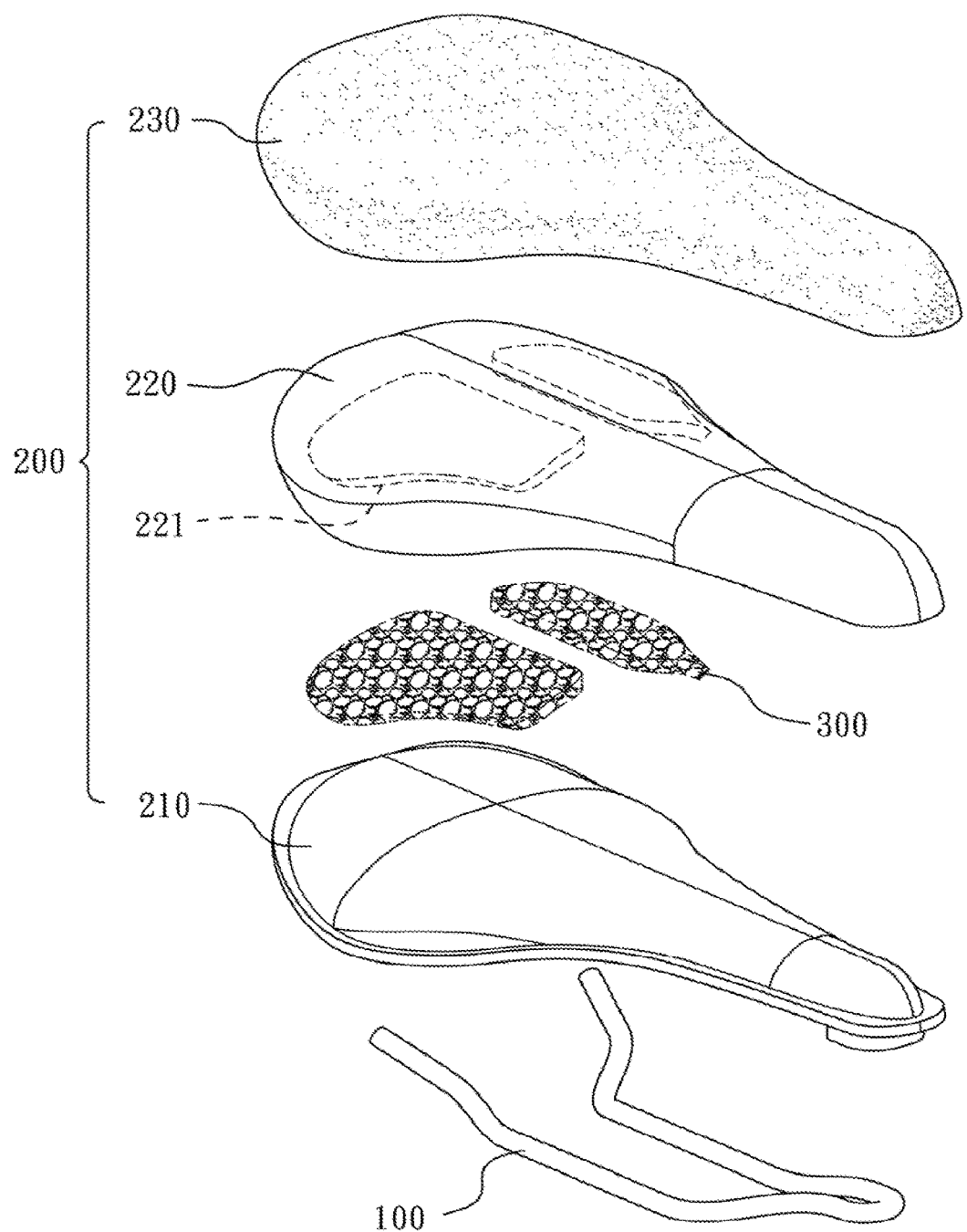
FIG. 1 is an exploded view of a bicycle seat according to one embodiment of the present disclosure.
Figure 2:
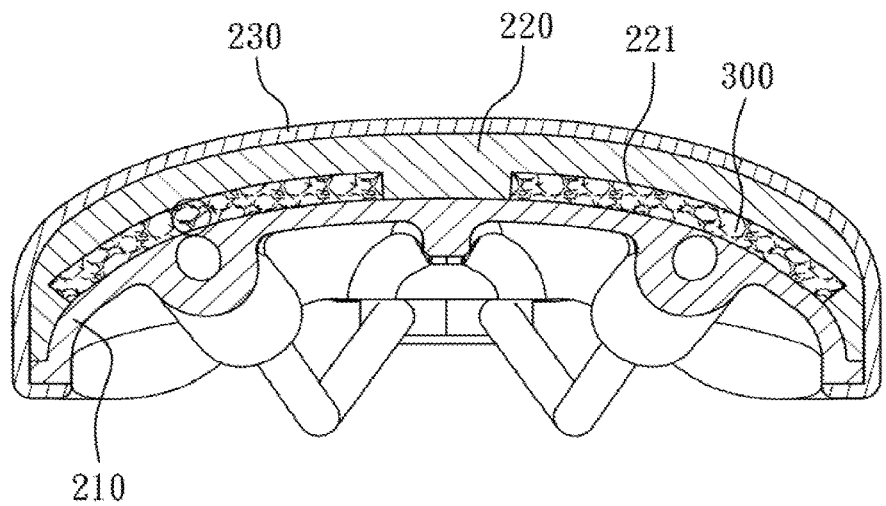
FIG. 2 is a cross-sectional view of the bicycle seat shown in FIG. 1.

FIG. 1 is an exploded view of a bicycle seat according to one embodiment of the present disclosure. FIG. 2 is a cross-sectional view of the bicycle seat shown of FIG. 2.

The bicycle seat includes a pair of parallel support rails 100 and a body 200 attached to the parallel support rails 100. The body 200 has a support portion 210, a foamed layer 220 and a seat cover 230. The support portion 210 is connected to the parallel support rails 100. The foamed layer 220 covers the support portion 210, and the seat cover 230 covers on the foamed layer 220. The foamed layer 220 of the body 200 has two deformation spaces 221. The foamed layer 220 and the seat cover 230 are formed from a soft material, and the support portion 210 is formed from a hard material. These two deformation spaces 221 are sandwiched between the support portion 210 and the foamed layer 220, and each of the deformation spaces 221 is closed by the support portion 210. The deformation spaces 221 are filled with a plurality of filler particles 300, and the deformation spaces 221 will be deformed by a sitting pressure. The filler particles 300 densely fill in the deformation space 221. When the deformation spaces 221 are deformed by a sitting pressure, the filler particles 300 are sliding and rolling under pressure in the deformation spaces 221.

Figure 3A:
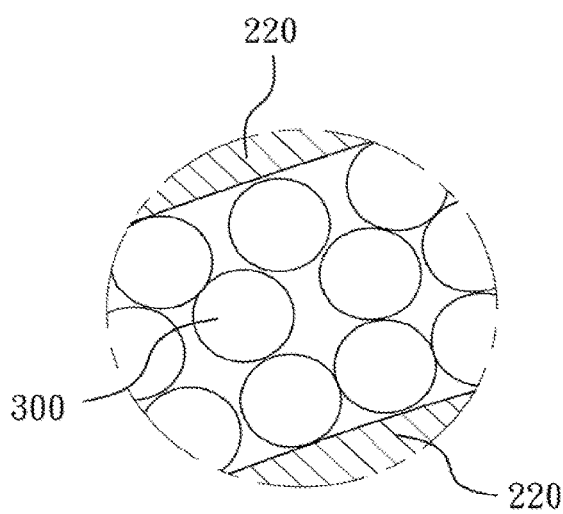
FIG. 3A is a partial cross-sectional view showing filler particles and a deformation space of the bicycle seat of FIG. 2.
Figure 3B:
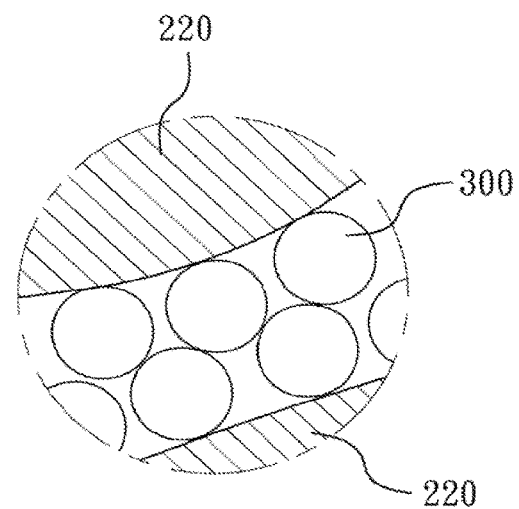
FIG. 3B is a partial cross-sectional view showing the filler particles and the deformation space of the bicycle seat of FIG. 2, when the filler particles are under pressure.

FIG. 3A is a partial cross-sectional view showing filler particles 300 and a deformation space 221 of the bicycle seat of FIG. 2. FIG. 3B is a partial cross-sectional view showing the filler particles 300 and the deformation space 221 of the bicycle seat of FIG. 2, when the filler particles 300 is sliding and rolling under pressure. When the deformation spaces 221 are deformed by a low sitting pressure, the filler particles 300 are sliding and rolling under pressure in the deformation space 221. Because the filler particles 300 roll and hit freely in the deformation spaces 221, the filler particles 300 will reduce the friction between the body 200 and a biker who is sitting on the bicycle seat. When the deformation spaces 221 are deformed by a high sitting pressure, the filler particles 300 are squeezed in the deformation spaces 221. Because the filler particles 300 fill in the deformation spaces 221, the filler particles 300 prevent a biker sitting on the bicycle seat from directing hitting the support portion 210.

Figure 4:
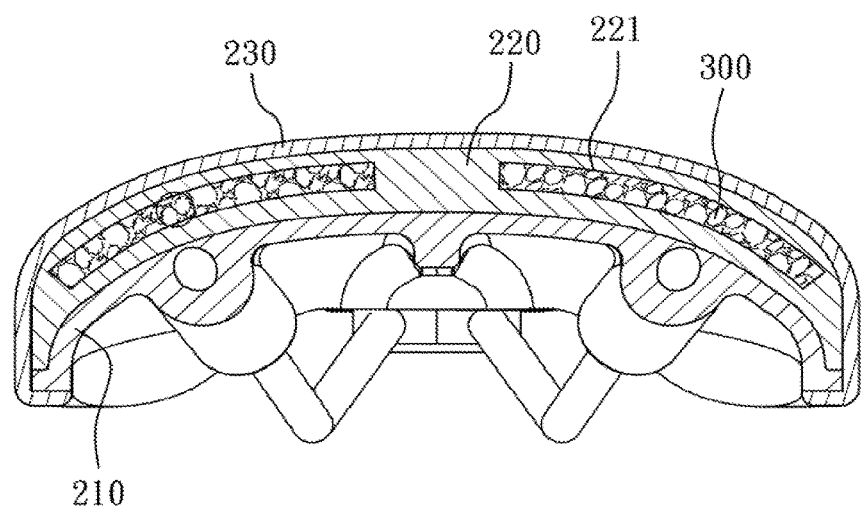
FIG. 4 is a cross-sectional view of a bicycle seat according to another embodiment of the present disclosure.
Figures 5A, 5B:
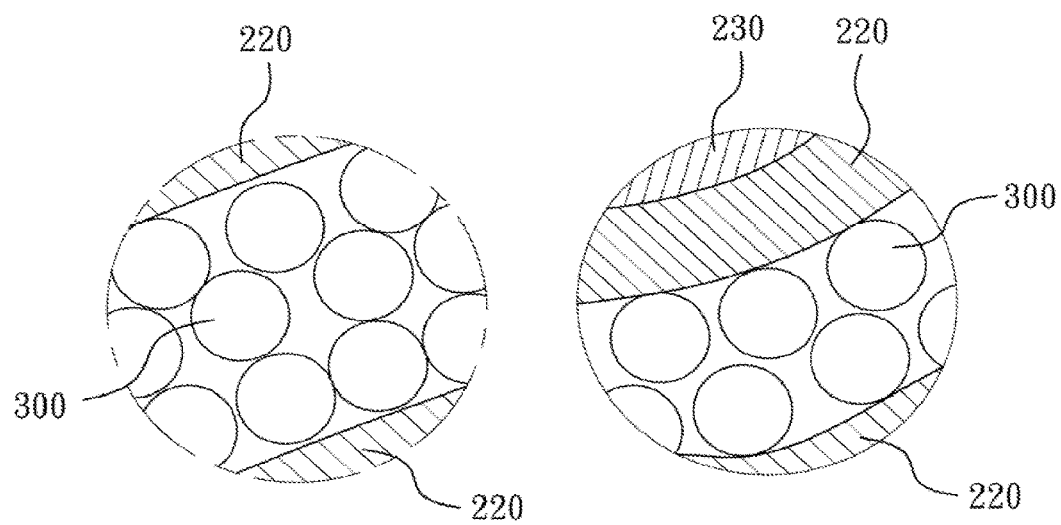
FIG. 5A is a partial cross-sectional view showing filler particles and a deformation space of the bicycle seat of FIG. 4.
FIG. 5B is a partial cross-sectional view showing the filler particles and the deformation space of the bicycle seat of FIG. 4, when the filler particles are under pressure.

FIG. 4 is a cross-sectional view of a bicycle seat according to another embodiment of the present disclosure. FIG. 5A is a partial cross-sectional view showing filler particles 300 of FIG. 4, and a deformation space 221 is without a sitting pressure. FIG. 5B is a partial cross-sectional view showing the filler particles 300 of FIG. 4, and the filler particles 300 are under pressure. Wherein, the foamed layer 220 of the body 200 has two deformation spaces 221. The foamed layer 220 and the seat cover 230 are formed from a soft material, and the support portion 210 is formed from a hard material. The two deformation spaces 221 are opened among the foamed layer 220, and each of the deformation spaces 221 is closed by the foamed layer 220. A portion of the foamed layer 220 and the support portion 210 sustain the bottom of the deformation spaces 221. Therefore, the deformation spaces 221 have large amount of deformation to give the softer feel.

Figure 6:
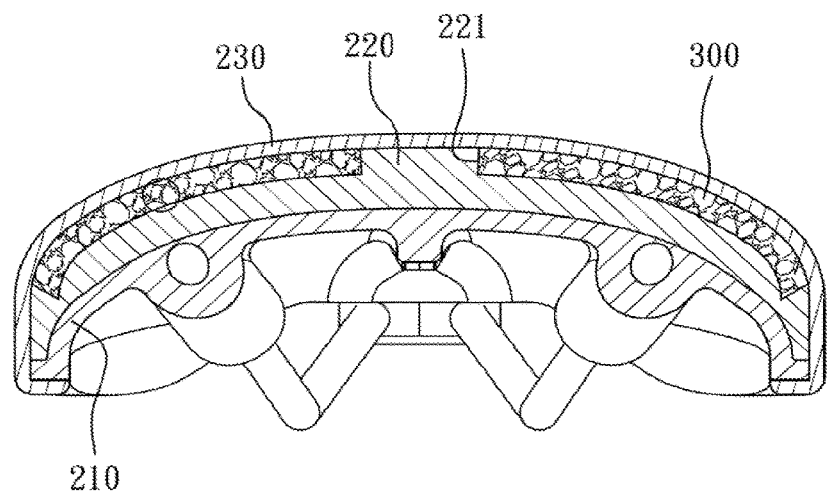
FIG. 6 is a cross-sectional view of a bicycle seat according to the third embodiment of the present disclosure.
Figures 7A, 7B:
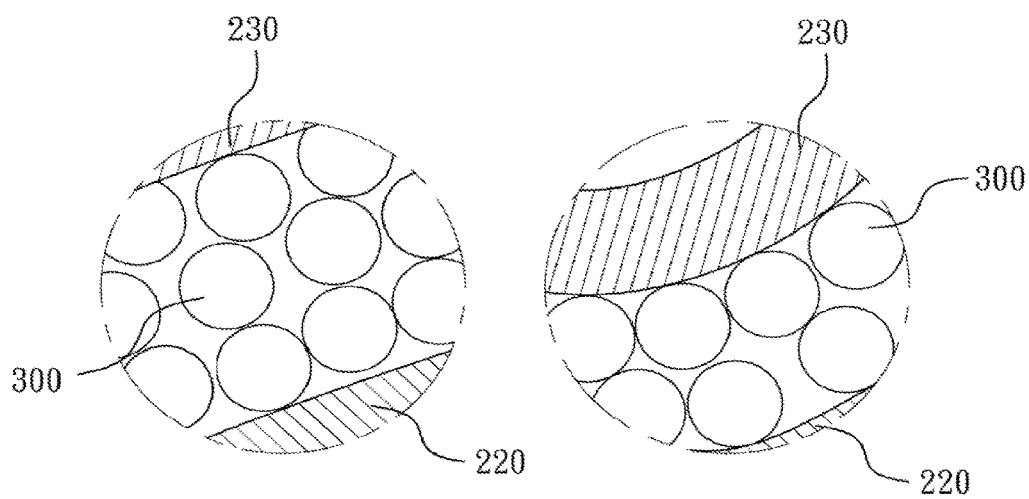
FIG. 7A is a partial cross-sectional view showing filler particles and a deformation space of the bicycle seat of FIG. 6.
FIG. 7B is a partial cross-sectional view showing the filler particles and the deformation space of the bicycle seat of FIG. 6, when the plurality of filler particles are sliding and rolling under pressure.

FIG. 6 is a cross-sectional view of a bicycle seat according to the third embodiment of the present disclosure. FIG. 7A is a partial cross-sectional view showing filler particles 300 and a deformation space 221 of the bicycle seat s f FIG. 6, and the deformation space 221 is without a sitting pressure. FIG. 7B is a partial cross-sectional view showing the filler particles 300 and the deformation space 221 of the bicycle seat of FIG. 6, and the filler particles 300 are under pressure. Wherein, the foamed layer 220 of the body 200 has two deformation spaces 221. The foamed layer 220 and the seat cover 230 are formed from a soft material, and the support portion 210 is formed from a hard material. Those two deformation spaces 221 are opened on the foamed layer 220, and each of the deformation spaces 221 is closed by the seat cover 230. A portion of the foamed layer 220 and the support portion 210 sustain the bottom of the deformation spaces 221. Therefore, the deformation spaces 221 have large amount of deformation, and the buttocks or the tail bone of the rider has softer feel.

Figure 8:
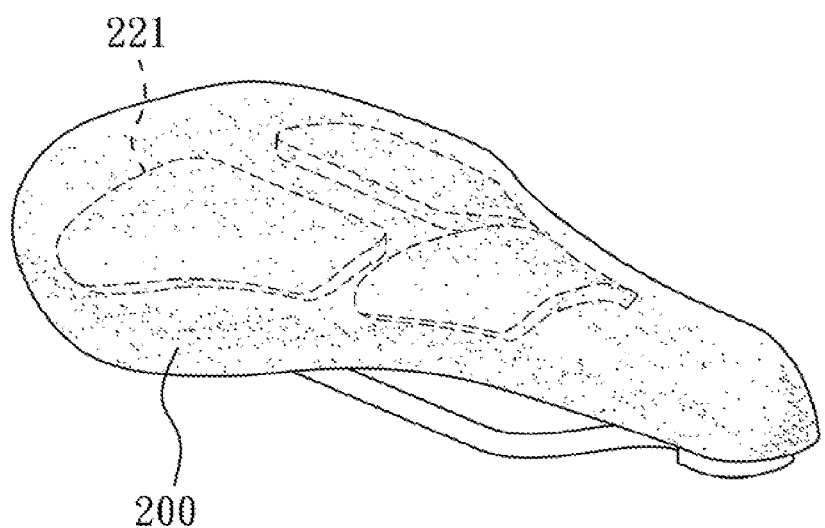
FIG. 8 is a perspective view f the deformation space of the bicycle seat in a first setting mode.

In FIG. 8, the body of the bicycle seat has three deformation spaces 221. Two of the deformation spaces 221 located at the rear are shaped to receive the buttocks of a rider. One of the deformation spaces 221 located at the front has an important advantage, since it not produce any pressure on the perineum.

Figure 9:
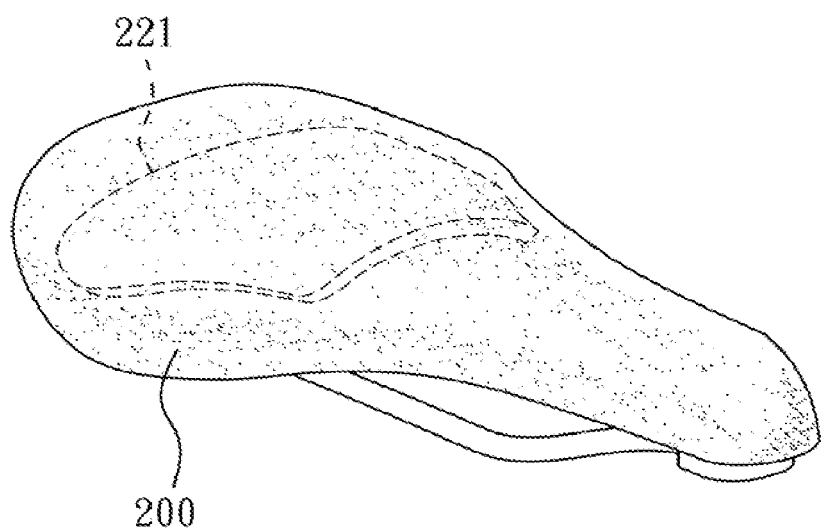
FIG. 9 is a perspective view showing the deformation space of the bicycle seat in a second setting mode.
Figure 10:
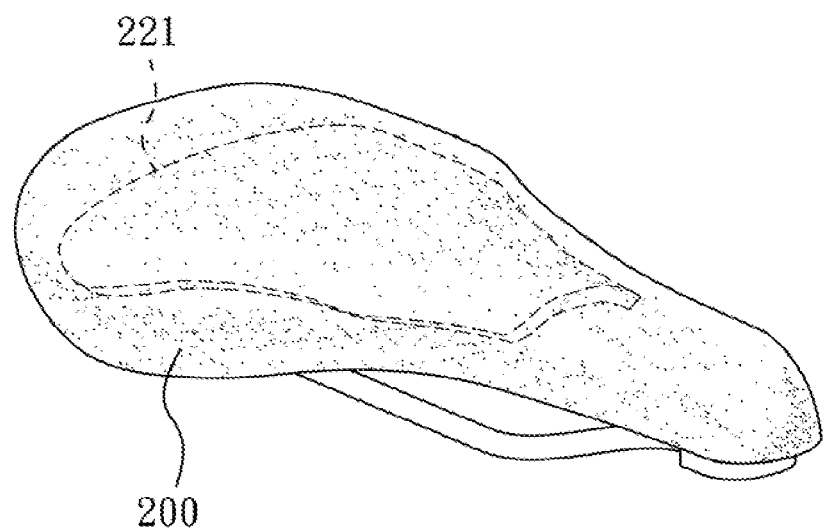
FIG. 10 is a perspective view showing the deformation space of the bicycle seat in a third setting mode.

In FIG. 9 and FIG. 10, the body of the bicycle seat has one deformation space 221, and the deformation space 221 can be designed to different sizes according to demands.

Figure 11:
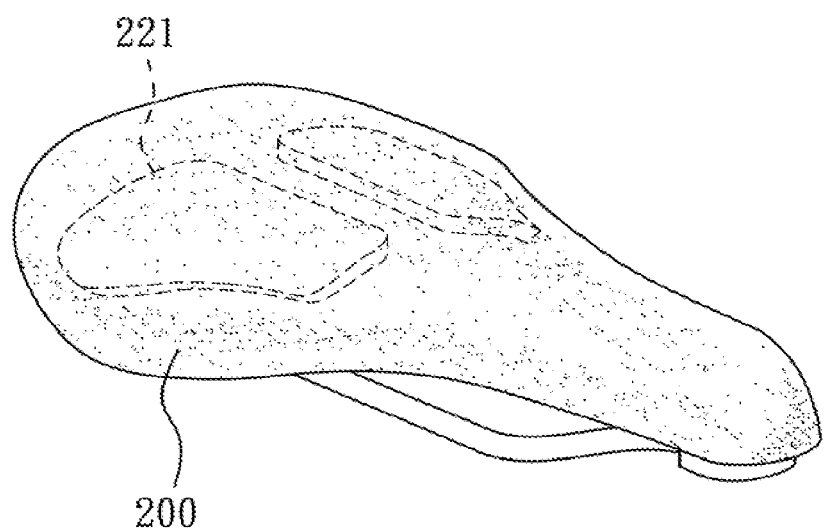
FIG. 11 is a perspective showing the deformation space of the bicycle seat in a fourth setting mode.

In FIG. 11, the body of the bicycle seat has two deformation spaces 221, and the two deformation spaces 221 are corresponding to each other to receive the buttocks of a rider.

Figure 12:
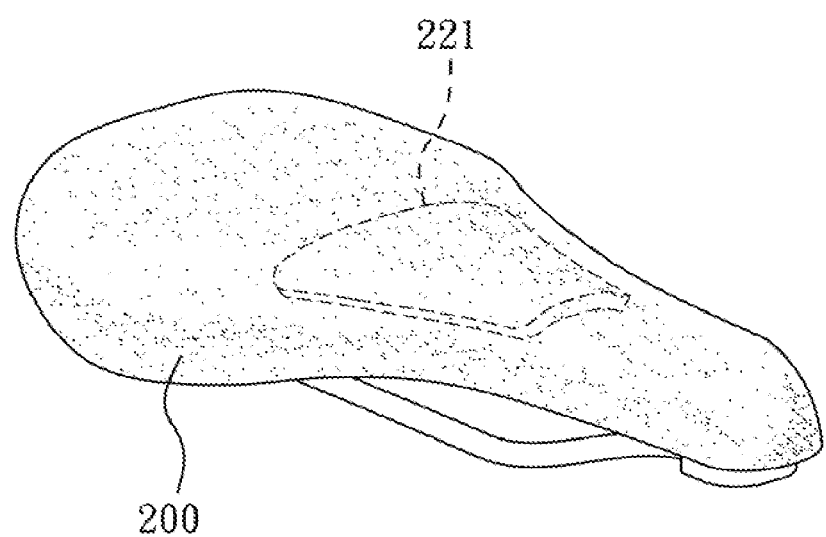
FIG. 12 is a perspective showing the deformation space of the bicycle seat in a fifth setting mode.

In FIG. 12, the body of the bicycle eat has one deformation space 221, and the deformation space 221 at the front does not produce any pressure on the perineum.

Figure 13:
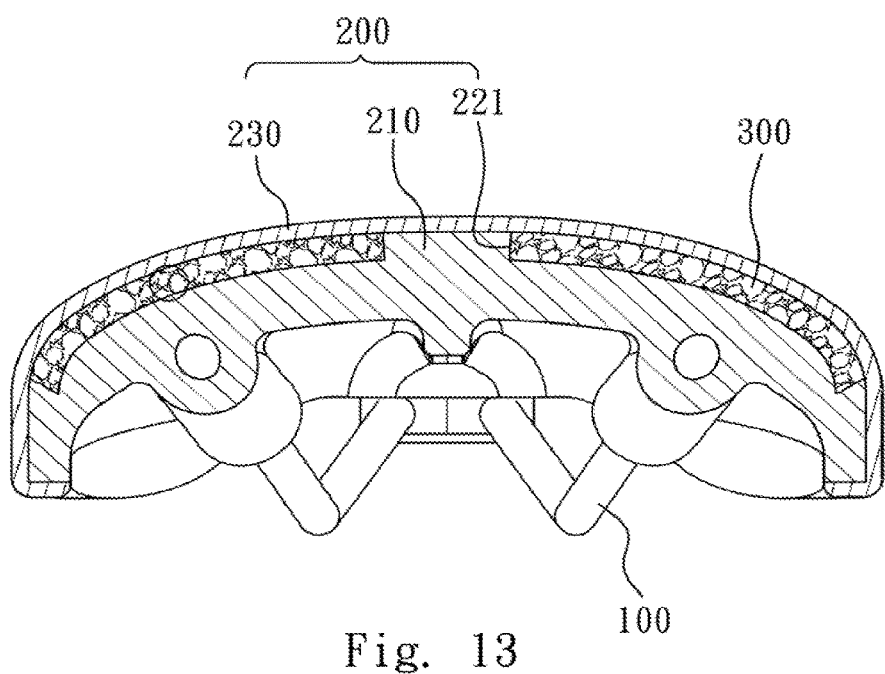
FIG. 13 is a cross-sectional view of a bicycle seat according to a fourth embodiment of the present disclosure.

FIG. 13 is a cross-sectional view of a bicycle seat according to a fourth embodiment. The bicycle seat includes a pair of parallel support rails 100 and a body 200 is attached to a pair of the parallel support rails 100. The body 200 includes a support portion 210 and a seat cover 230. The support portion 210 is connected to the parallel support rails 100. The seat cover 230 covers on the support portion 210. The support portion 210 of the body 200 has two deformation spaces 221. The seat cover 230 is formed from a soft material, and the support portion 210 is formed from a hard material. Those two deformation spaces 221 are sandwiched between the support portion 210 and the seat cover 230, and each of the deformation spaces 221 is closed by the seat cover 230. The deformation spaces 221 are filled with a plurality of filler particles 300, and the deformation spaces 221 will be deformed by a sitting pressure. The filler particles 300 densely fill in the deformation space 221. When the deformation spaces 221 are deformed from a sitting pressure, the filler particles 300 are sliding and rolling under pressure in the deformation space 221.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bicycle seat comprising:
   a seat cover;
   a rigid support portion;
   a foamed layer positioned between the seat cover and the support portion, a first deformation space is positioned in the foamed layer; and
   dry and rigid filler particles freely disposed in the first deformation space, each of the filler particles is independently displaceable within the first deformation space when a sufficient pressure is applied to the foamed layer.

2. The bicycle seat of claim 1, wherein:
   a second deformation space positioned in the foamed layer, the second deformation space is separate from the first deformation space; and
   a third deformation space positioned in the foamed layer, the third deformation space is separate from the first deformation space and the second deformation space.

3. The bicycle seat of claim 2, wherein:
the first deformation space and second deformation space are located at a rear portion of the bicycle seat and the third deformation space is located at a front portion of the bicycle seat.

4. The bicycle seat of claim 1, wherein:
the first deformation space includes a top and a bottom; and
the first deformation space is enclosed at the top by a portion of the foamed layer that defines the first deformation space and enclosed at the bottom by a portion of the support portion.

5. The bicycle seat of claim 4, wherein:
the first deformation space has a height that is smaller than a height of the rigid support portion.

6. The bicycle seat of claim 4, wherein:
a second deformation space positioned in the foamed layer, the second deformation space is separate from the first deformation space; and
a third deformation space positioned in the foamed layer, the third deformation space is separate from the first deformation space and the second deformation space, the first deformation space and second deformation space are located at a rear portion of the bicycle seat and the third deformation space is located at a front portion of the bicycle seat, the third deformation space is configured to not produce any pressure on a perineum of a rider sitting on the bicycle seat.

7. The bicycle seat of claim 1, wherein:
the first deformation space is positioned completely within the foamed layer such that a top, a bottom and all sides of the first deformation space are surrounded by the foamed layer, the first deformation space is not the foamed layer.

8. The bicycle seat of claim 7, wherein:
wherein the deformation space has a height that is smaller than a height of the foamed layer.

9. The bicycle seat of claim 1, wherein:
the first deformation space is completely enclosed by and directly adjacent to the foamed layer and the seat cover.

10. The bicycle seat of claim 9, wherein:
wherein the deformation space has a height that is smaller than a height of the foamed layer.

* * * * *